United States Patent [19]

Imbert et al.

[11] Patent Number: 4,942,472
[45] Date of Patent: Jul. 17, 1990

[54] DETECTION CIRCUIT FOR A VIDEO TAPE RECORDER SIGNAL

[75] Inventors: Michel Imbert, Seyssins; Jean-Marc Merval, Saint Egreve, both of France

[73] Assignee: SGS-Thomson Microelectronics S.A., Gentilly, France

[21] Appl. No.: 284,311

[22] Filed: Dec. 6, 1988

[30] Foreign Application Priority Data

Jan. 4, 1988 [FR] France .................................. 88 00168

[51] Int. Cl.$^5$ ............................................... H04N 5/04
[52] U.S. Cl. .................................... 358/188; 358/148; 358/158
[58] Field of Search ................ 358/188, 181, 139, 148, 358/150, 151, 158

[56] References Cited

U.S. PATENT DOCUMENTS

| | | | |
|---|---|---|---|
| 3,715,499 | 2/1973 | Steckler | 331/17 |
| 3,909,735 | 9/1975 | Anderson et al. | 331/17 |
| 4,496,978 | 1/1985 | Sakamoto | 358/155 |
| 4,536,794 | 8/1985 | Fernsler | 358/158 |
| 4,636,860 | 1/1987 | Duijkers | 358/148 |
| 4,660,080 | 4/1987 | Dietz | 358/158 |
| 4,791,488 | 12/1988 | Fukazawa | 358/148 |
| 4,809,068 | 2/1989 | Nagai | 358/148 |
| 4,812,907 | 3/1989 | Hathaway | 358/148 |

FOREIGN PATENT DOCUMENTS

| | | |
|---|---|---|
| 0033818 | 12/1980 | European Pat. Off. . |
| 2826725 | 6/1978 | Fed. Rep. of Germany . |
| 2116415 | 11/1971 | France . |
| 38216 | 8/1978 | Japan ................................ 358/158 |
| 25874 | 3/1981 | Japan ................................ 358/158 |
| 58373 | 5/1981 | Japan ................................ 358/158 |

Primary Examiner—Tommy P. Chin
Attorney, Agent, or Firm—Lowe, Price, LeBlanc, Becker & Shur

[57] ABSTRACT

A detection circuit for a video tape recorder signal on the input of a TV set connected to a line synchronization separating circuit (11) in turn connected to a PLL (12) comprises a first phase comparator (15), the PLL (12) exhibiting a first time constant (I1, C1) corresponding to an operation on a normal TV signal. This circuit further comprises a switch (20) for switching the PLL on a second time constant (3I1, C1) shorter than the first one, a second phase comparator (22) for comparing the input and output phases of the first phase comparator, the second phase comparator being associated with a third time constant (I2, C2) shorter than the first and second ones, a threshold comparator (24) supplying to the switch (20) a control signal when the comparator output (22) is outside determined limits.

15 Claims, 1 Drawing Sheet

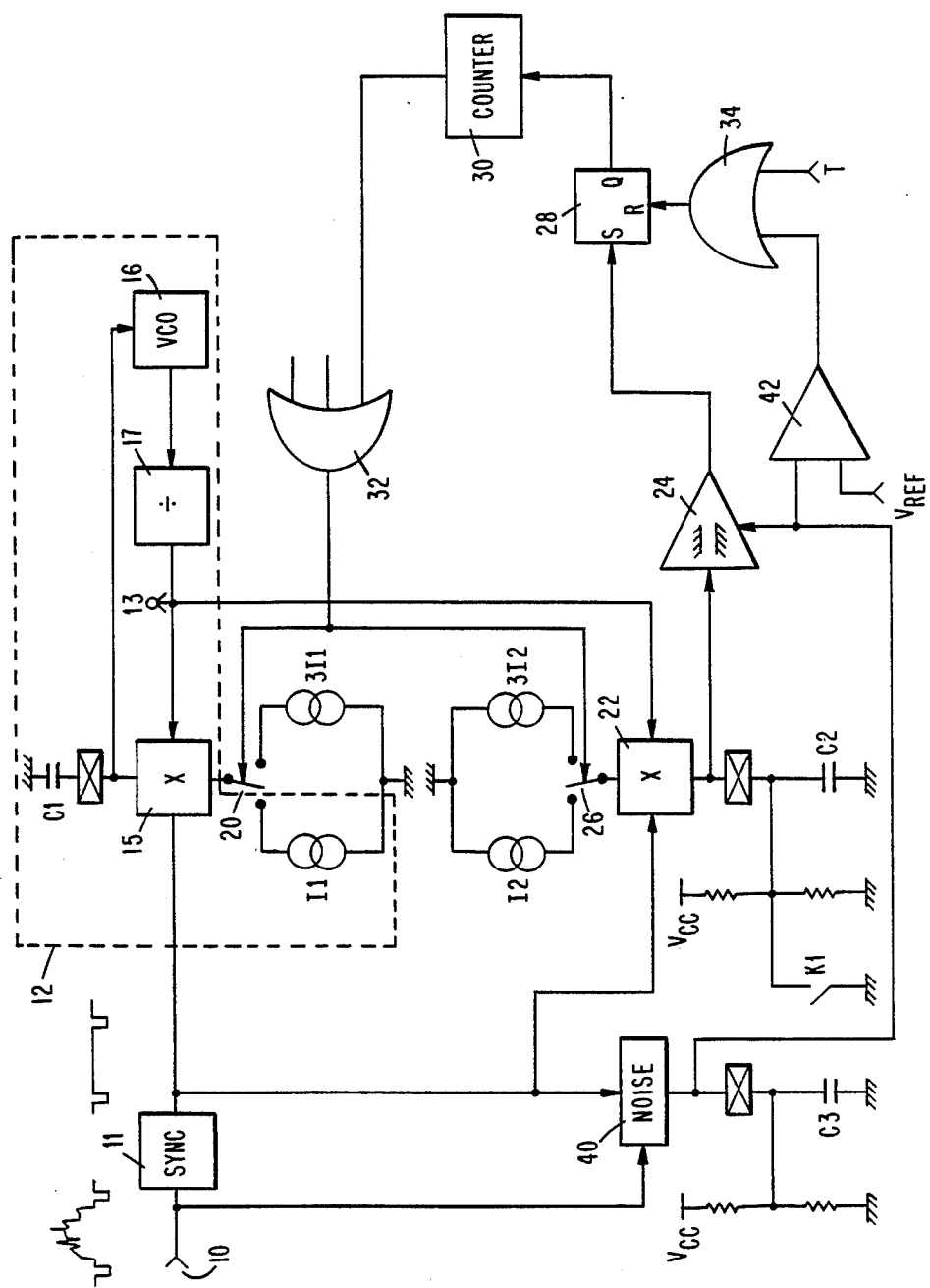

DETECTION CIRCUIT FOR A VIDEO TAPE RECORDER SIGNAL

BACKGROUND OF THE INVENTION

The instant invention relates to the field of TV sets, and more particularly to multifunction TV sets provided, in addition to an antenna tap, with a peritelevision tap.

TV sets were first essentially designed for receiving signals picked up by an aerial antenna. Later, with the invention of video tape recorders, those TV sets had to be adapted in order to receive picture signals recorded on magnetic tape. Another evolution is the use of the TV sets not only for receiving and displaying TV signals but for serving as a computer terminal equipment, and even in some cases for superimposing computer pictures over TV pictures. Thus, the peritelevision tap, at first intended for one connection only to a video tape recorder, is liable for example to serve as a connection for a microcomputer, a video game device, a satellite reception antenna, communication arrays, etc.

The processing by the TV set of those various signals usually requires the modification of at least some of its internal circuits. It has therefore been necessary to provide for hand operated switching systems for the proper configuration of the TV set according to the device to which the peritelevision tap (or in some cases the antenna tap) is connected while, initially, the mere fact of connecting the peritelevision tap indicated that a video recorder was connected.

SUMMARY OF THE INVENTION

An object of the invention is to provide for a circuit permitting to automatically detect that the TV set is receiving a video tape recorder signal and not another type of signal, and therefore to supply the necessary switching signals for appropriately configuring the TV set.

The instant invention will be disclosed in more detail for the case it is desirable to detect the video tape recorder signal in order to automatically switch the time constant of the phase locked loop which serves to regenerate the line synchronization signals inside the TV set but it will be apparent that this detection is liable to be used for switching other functions inside the TV set.

In order to achieve this purpose, the instant invention provides for a identification circuit for the arrival of a video tape recorder signal at a TV input connected to a line synchronization signal separating circuit, in turn connected to a phase locked loop (PLL), comprising a first phase comparator and a voltage controlled oscillator (VCO), designed to regenerate the synchronization signal inside the TV set, this PLL exhibiting a first long time constant corresponding to an operation with an antenna signal, and further comprising means for switching the PLL on a second time constant short with respect to the first one, a second phase comparator for comparing the input and output phases of the first phase comparator, said second phase comparator being associated with a third time constant short with respect to the first and second ones, and a threshold comparator supplying a control signal when the output of the second phase comparator is outside determined limits, this control signal acting upon said switching means.

According to an embodiment of the invention, the second phase comparator is liable to be associated with a fourth time constant short with respect to the first, second and third time constants, and within the same ratio with respect to the third time constant as the second constant with respect to the first time constant, said fourth time constant being switched on the second phase comparator at the same time as the second time constant is switched on the PLL.

According to an embodiment of the invention, a detector of the HF noise (300 KHz–1 MHz) in the video signal received by the TV set durig the line synchronization signals, and means for setting the limits of the threshold comparator in relation with the noise level, are further provided.

According to an embodiment of the invention, a comparator for comparing the noise signal with the reference voltage and inhibiting the action of the control signal when the noise signal overcomes the reference threshold, is further provided.

According to an embodiment of the invention, a hand operated switch for forcing the threshold comparator input outside the predetermined limits and causing the hand operated switching of the PLL on the secod time constant, is further provided.

According to an embodiment of the invention, means for forcing the switching means to the second time constant during the first video signal detection are further provided, whereby a faster locking of the phase locked loop onto the synchronization frequency is obtained.

According to an embodiment of the invention, the control signal is transmitted to the switching means through a RS flip-flop and a p-frames counter, whereby the switching means can be operated only p frames after the end of the control signal, p being comprised between 2 and 10.

BRIEF DESCRIPTION OF THE DRAWING

Those objects, features, advantages and others of the instant invention will clearly appear from the following detailed description of a preferred embodiment, in connection with the attached FIGURE which shows a block diagram of a circuit according to the invention.

DETAILED DESCRIPTION OF THE INVENTION

The signal received by the TV set, after a first demodulation, arrives at the input terminal 10 of a synchronization separating circuit 11. The conventional shape of a TV signal has been shown above the input 10 of the synchronization separator 11 between two line synchronization tops. Above the output of the synchronization separator 11 synchronization pulses, separated from the rest of the video signal, are shown.

This line synchronization signal is conventionally sent to a phase locked loop 12 designed to regenerate on a terminal 13 an internal synchronization signal, in phase with the input synchronization signal while suppressing the noise, and permitting to continue to supply an internal synchronization signal even though the synchronization signal received is temporarily interrupted. The PLL conventionally comprises a phase comparator 15 and a voltage controlled oscillator (VCO) 16. Conventionally, the VCO oscillates at a frequency which is a multiple of the line synchronization signal frequency, for example 32 times this frequency. The VCO 16 is therefore followed by a divider 17, here dividing by 32. The phase comparator 15 receives on its first input the output signal of the sync separator 11 and on its second input the output of divider 17. The internal sync signal is taken out from this second input on terminal 13. On the other hand, a time constant is associated with this PLL, and is provided by a capacitor C1 into which a current form a current source I1 is injected (the time constant is associated with the capacitor charging time, that is, when the current source flow increases, said charging time is lowered and the time constant decreases). In a conventional TV set PLL, the time constant has a value corresponding, for example, to the duration of 20 lines. In a practical case, when the line frequency is 15,625 kilohertz, the line scanning duration is 64 microseconds, which corresponds to a time constant of 1.280 ms. Choosing such a time constant gives satisfactory results for the processing of a TV signal essentially impaired with HF noise and possibly with the absence of a few synchronization tops.

What has been described reflects the present state of conventional circuits and is well known by those skilled in the art.

In case the signals received on terminal 10 correspond to signals from a video tape recorder (VTR) and no longer to signals resulting from a direct TV transmission, the nature of the noise affecting those signals and especially the line synchronization tops is no longer the same. The VTR signals usually exhibit a fluctuation of the line frequency at a low frequency, corresponding to mechanical drifts of the magnetic tape and to variations of the VTR engine speed. Thus, the frequency varies in a range which is usually included between 10 and 30 hertz. But, there is little high frequency noise is a VTR signal.

If the PLL high time constant hereinabove mentioned is maintained, those low frequency fluctutations will be integrated and the PLL will supply an average stable frequency without following those fluctuations. As a result, a distortion of the TV picture called flag effect will occur, that is, a vertical curved line will appear, which is very unpleasant for the TV viewer.

In order to eliminate this drawback, it has been proposed to switch the PLL time constant to a shorter time constant when a VTR signal occurs. This can be carried out by providing a switch 20 connecting a higher current source to capacitor C1. In the given example, this current source is a current source 3I1 having a value triple with respect to current source I1, that is, the time constant will be three times lower and the PLL will be able to follow the low frequency fluctuations. According to the prior art, this switch was hand operated, or a specific PLL was provided for detecting a VTR signal.

The instant invention provides for automatic detection means of a VTR signal on terminal 10 for automatically acting upon switch 20. Moreover, the detection signal of connection to a VTR is liable to be used for modifying other desirable functions of a TV set.

According to the instant invention, in order to ascertain a VTR signal is present on terminal 10, it is proposed to detect the presence of low frequency oscillations in the synchronization signal. For this purpose, the instant invention provides for the use of a phase comparator 22 for comparing the output signal of the synchronization separator 11 with the output signal of PLL 12. The comparator 22 will have a time constant substantially shorter than that of the PLL in order to detect the hereinabove mentioned low frequency fluctuations. The time constant of comparator 22 is determined by a capacitor C2 fed by a current source I2. The output of the phase comparator 22 is connected to a threshold comparator 24 which supplies a low level signal as long as the output signal of the phase comparator 22 remains within the determined limits, that is, in fact, as long as only HF noise appears in the line synchronization signal, and which supplies a high level signal when the threshold comparator 24 indicates that the output of the phase comparator is outside the predetermined limits, that is, when a low frequency noise corresponding to the type of noise of a VTR synchronization signal appears. The output of the threshold comparator 24 controls the switching of switch 20. It simultaneously controls the switching of another switch 26 designed to further reduce the time constant of the phase comparator 22, by providing a current source higher than current source 12 for charging the capacitor C2. In the given example, this second current source is a current source 3I2, the value of which is triple. Indeed, it is necessary, when the PLL starts following the low frequency fluctuations of the VTR signal, to more precisely detect the residual fluctuations of this signal by means of this phase comparator 22.

As hereinabove mentioned, the time constant of the phase comparator 22 has to be shorter than that of the PLL 12. In practice, if a time constant corresponding to the duration of 20 TV lines has been chosen for the PLL 12, it will be possible to choose a time constant corresponding to 5 TV lines for the phase comparator 22. Therefore, there is a ratio 4 between the time constant of the PLL 12 and the one of the phase comparator 22, this ratio being maintained when switches 20 and 26 are switched.

Further practical embodiments of the instant invention will now be disclosed.

The output signal of the threshold comparator 24 is not, in practice, directly applied onto the gate of switches 20 and 26. The output of the threshold comparator 24 is connected to an enable input, S, of a RS flip-flop 28, the output Q of which is applied to a p-frames counter 30 supplying a high level signal during its counting duration ; that is, from the time the counter has been started, its output supplies a high level signal during p TV frames even though its control signal has been interrupted. In one embodiment, p can be equal to 4. The output of counter 30 is transmitted through an OR gate 32 to the control circuits, not shown, of switches 20 and 26. The flip-flop 28 comprises a reset terminal R which receives the output of an OR gate 34. This OR gate receives on a first input a frame synchronization signal T, which is available in the TV circuit for resetting this flip-flop at each frame, that is, if a new signal is not supplied to the S input of the flip-flop, the frame counter will stop supplying an output signal after four frames.

On the other hand, the instant invention provides for a HF noise detector 40 receiving the signal on terminal 10 and operating during the occurrence of the line synchronization signal as indicated by the connection of this noise detection circuit 40 to the output of the synchronization detector 11. This noise detector is conventionally connected to a time constant circuit comprising a capacitor C3 biased by a connection to the intermediate tap of two resistors connected between the ground and a supply voltage VCC. The output of the noise detector is connected, on the one hand, to a control input of the threshold comparator 24 for extending the detection limits of this threshold comparator when the noise increase and, on the other hand, to the first input of a comparator 42, the other input of which receives a reference voltage for detecting the time when the noise overcomes a predetermined threshold. In that case, the output of comparator 42 is transmitted through the OR gate 34 to the R input of the flip-flop 28 for definitively resetting same and inhibiting the action of the VTR signal detector essentially comprising the comparators 22 and 24. Indeed, if an important noise is detected during the line synchronization signals, this very likely means that the VTR mode is not present but, for example, that an incoming TV signal is very noisly.

Moreover, it will be noted that capacitor C2 is biased at an average voltage value by means of a connection to the intermediate tap of two resistors connected between the ground and a supply source VCC so that the output signal of the phase comparator is compatible with a threshold comparator. On the other hand, a hand operated switch K1 is parallel arranged with respect to capacitor C2 in case it would be desirable to impose the short time constant for the PLL independently of the automatic detection of a VTR signal.

The OR gate 32 is liable to receive several other inputs for the automatic control of the PLL switching on a shorter time constant, independently of the detection of a VTR signal. This may for example systematically be the case during the first two frames once circuits, not shown, have detected the first occurrence of a VTR signal. This permits to initially reduce the time constant of the PLL and therefore to accelerate its setting on the synchronization signal frequency. Further controls are liable to be devised, for example a control device during a few lines at the end of each frame retrace.

The detection circuit of a VTR signal has been described here in connection with a preferred embodiment, it is apparent that it is liable of numerous variations, especially as regards the time constant values and the circuit implementation. Indeed, other more complex circuits can also be used in relation with the PLL but this has not been disclosed here since it relates to devices well known by those skilled in the field of TV circuits.

We claim:

1. A circuit for recognizing a signal from a video tape recorder (VTR) supplied to a television set input wherein said signal is selectively supplied from either said VTR or from an off-the-air received TV signal, said input being connected to a line synchronization signal separator (11) for detecting a line synchronization signal from said signal and supplying said line synchronization signal to a phase locked loop (PLL) (12), comprising a first phase comparator (15) and a voltage controlled oscillator (16), designed for regenerating said line synchronization signal supplied by said synchronization signal separator (11), said phase locked loop having a first time constant (I1, C1) corresponding to said-off-the-air received TV signal input, further comprising:
   means (20) for switching the PLL to operate using a second time constant (3I1, C1) which is shorter than the first time constant;
   a second phase comparator (22) for comparing the phases of signals at input and output terminals of the PLL, said second phase comparator having a third time constant (I2, C2) which is shorter than said first and second time constants; and
   a threshold comparator (24) supplying a control signal when the output of the second phase comparator is outside predetermined limits, said switchig means being responsive to said control signal.

2. A detection circuit for a video tape recorder signal according to claim 1, wherein the second phase comparator (22) is selectively operable with a fourth time constant (3I2, C2) which is shorter than said first, second and third time constants, and in the same ratio with respect to the third time constant as the second constant with respect to the first time constant, said second phase comparator selectively operable with said fourth time constant in response to said PLL operating with said second time constant.

3. A detection circuit for a video tape recorder signal according to claim 1, further comprising:
   a detector (40) of a high frequency noise level present in said off-the-air video signal received by the TV set during a line synchronization period; and
   means for setting the threshold comparator (24) limits as a function of said high frequency noise level.

4. A detection circuit for a video tape recorder signal according to claim 3, further comprising a comparator (42) for comparing said high frequency noise level with a reference voltage and means (34) for inhibiting the control signal in response to said noise level exceeding said reference voltage.

5. A detection circuit for a video tape recorder signal according to claim 1, further comprising means including a manually operated switch (K1) for supplying a signal to said threshold comparator input (24) which is outside said predetermined limits whereby said PLL is operated using said second time constant.

6. A detection circuit for a video tape recorder signal according to claim 1, further comprisig means for forcing the switching means (20) to operate with the second time constant in response to detection of a video signal, whereby a faster locking of the phase locked loop on the line synchronization signal is realized.

7. A detection circuit for a video tape recorder signal according to claim 1, wherein the control signal is transmitted to the switching means (20) through a RS flip-flop (28) and a p-frames counter (30), whereby the switching means can be operated only p frames after the end of said control signal, p being a value between 2 and 10.

8. A circuit for distinguishing between first and second composite video signals and provide a control signal responsive thereto, comprising:
   a synchronization signal separator (11) receivig an inputted one of said composite video signals for detecting a line synchronization signal of said inputted signal; and
   a phase locked loop (PLL) (12), comprising a first phase comparator (15) and a voltage controlled oscillator (16), said PLL (12) receiving said line synchronization signal and, in response, regenerating said line synchronization signal, said phase locked loop having a first time constant (I1, C1) predetermined to correspond to a line synchronization frequency of said first composite video signal, said PLL further including
   means (20) for switching the PLL to operate using a second time constant (3I1, C1) which is shorter than the first time constant,
   a second phase comparator (22) for comparing the phases of signals at input and output terminals of the PLL, said second phase comparator having a third time constant (I2, C2) which is shorter than said first and second time constants; and a threshold comparator (24) supplying said control signal when the output of the second phase comparator is outside predetermined limits, said switching means being responsive to said control signal.

9. A circuit for distinguishing between first and second composite video signals according to claim 8, wherein the second phase comparator (22) is selectively operable with a fourth time constant (3I2, C2) which is shorter than said first, second and third time constants, and in the same ratio with respect to the third time constant as the second constant with respect to the first time constant, said second phase comparator selectively operable with said fourth time constant in response to said PLL operating with said second time constant.

10. A circuit for distinguishing between first and second composite video signals according to claim 8, further comprising:
a detector (40) of a high frequency noise level present in said first composite video signal during a line synchronization period thereof; and
means for setting the threshold comparator (24) limits as a function of said high frequency noise level.

11. A circuit for distinguishing between first and second composite video signals according to claim 10, further comprising a comparator (42) for comparing said high frequency noise level with a reference voltage and means (34) for inhibiting the control signal in response to said noise level exceeding said reference voltage.

12. A circuit for distinguishing between first and second composite video signals according to claim 8, further comprising means for supplying a signal to said threshold comparator input (24) which is outside said predetermined limits whereby said PLL is operated using said second time constant.

13. A circuit for distinguishing between first and second composite video signals according to claim 8, further comprising means for forcing the switching means (20) to operate with the second time constant in response to detection of said first video signal, whereby a faster locking of the phase locked loop on the line synchronization signal is realized.

14. A circuit for distinguishing between first and second composite video signals accordig to claim 8, wherein the control signal is transmitted to the switching means (20) through a RS flip-flop (28) and a p-frames counter (30), whereby the switching means can be operated only p frames after the end of said control signal, p being a value between 2 and 10.

15. A circuit for detecting a noise charactersitic of an inputted composite video signal thereby to distinguish between first and second composite video signals and provide a control signal responsive thereto, comprising:
a synchronization signal separator (11) receiving said inputted composite video signal for detecting a line synchronization signal of said inputted signal; and
a phase locked loop (PLL) (12), comprising a first phase comparator (15) and a voltage controlled oscillator (16), said PLL (12) receiving said line synchronization signal and, in response, regenerating said line synchronization signal, said phase locked loop having a first time constant (I1, C1) predetermined to correspond to a line synchronization frequency of said first composite video signal, said PLL further including
means (20) for switching the PLL to operate using a second time constant (3I1, C1) which is shorter than the first time constant,
a second phase comparator (22) for comparing the phases of signals at input and output terminals of the PLL, said second phase comparator having a third time constant (I2, C2) which is shorter than said first and second time constants; and
a threshold comparator (24) supplying said control signal when the output of the second phase comparator is outside predetermined limits, said switching means being responsive to said control signal.

* * * * *